United States Patent [19]
Sakakiyama et al.

[11] 4,377,223
[45] Mar. 22, 1983

[54] ELECTRO-MAGNETIC CLUTCH CONTROL SYSTEM FOR AUTOMOBILES

[75] Inventors: Ryuzo Sakakiyama, Tokyo; Shoichi Usunami, Mitaka, both of Japan

[73] Assignee: Fuji Jukogyo Kabushiki Kaisha, Tokyo, Japan

[21] Appl. No.: 223,675

[22] Filed: Jan. 9, 1981

[30] Foreign Application Priority Data

Jan. 10, 1980 [JP] Japan ................................ 55-1558

[51] Int. Cl.³ ...................... F16D 27/00; B60K 41/22
[52] U.S. Cl. .................................. 192/3.58; 192/52; 192/84 R; 192/103 R; 310/94
[58] Field of Search .............. 192/3.56, 3.58, 21.5, 192/0.08, 84 R, 52, 109 F, 103 R, 0.052; 310/94, 95

[56] References Cited

U.S. PATENT DOCUMENTS

| | | | |
|---|---|---|---|
| 2,688,388 | 9/1954 | Gill | 192/0.052 |
| 2,880,595 | 4/1959 | McGuffey et al. | 192/52 X |
| 2,981,846 | 4/1961 | Maurice et al. | 310/95 X |
| 3,073,422 | 1/1963 | Baumann | 192/0.052 |
| 3,141,103 | 7/1964 | Asano | 310/95 |
| 3,258,094 | 6/1966 | Zechnall et al. | 310/94 X |
| 3,989,129 | 11/1976 | Brandenstein | 192/52 X |

*Primary Examiner*—George H. Krizmanich
*Attorney, Agent, or Firm*—Martin A. Farber

[57] ABSTRACT

A system for controlling an electro-magnetic clutch for automobiles has a stepwise increase of the clutch torque for reducing the engaging shock. The system comprises a gate circuit for producing a signal by signal by shift lever clutch operation, a monostable multivibrator for producing a clutch engaging period signal by the output signal of the gate circuit for a predetermined clutch engaging period, a pulse generating circuit for producing a pulse train and a constant control signal in dependency on the mode of the clutch engaging period signal, and a control circuit for maintaining the current flowing through the magnetizing coil of the clutch at a lower value in response to the pulse train for providing a small clutch torque of the clutch and maintaining the current at a rated value in response to the constant control signal for completely engaging the clutch.

3 Claims, 4 Drawing Figures

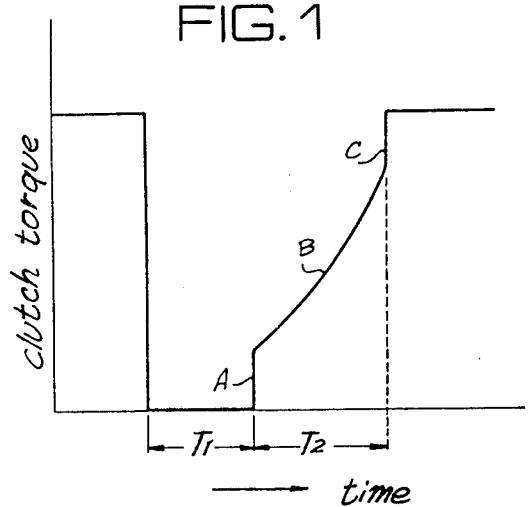
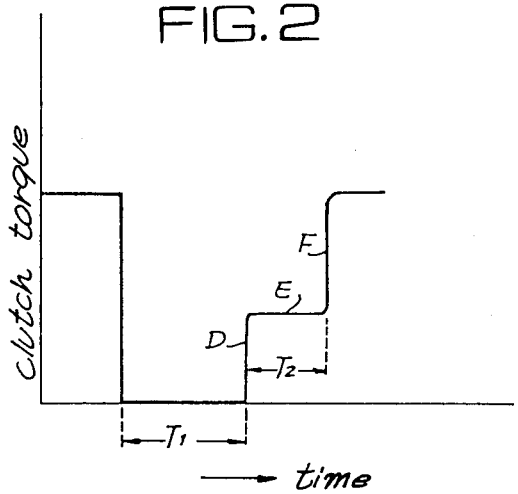

ELECTRO-MAGNETIC CLUTCH CONTROL SYSTEM FOR AUTOMOBILES

BACKGROUND OF THE INVENTION

The present invention relates to a system for controlling an electro-magnetic clutch for automobiles, and more particularly to a system for an electro-magnetic powder clutch which may decrease the shock at the change of the transmission ratio.

The electro-magnetic clutch as disclosed in the U.S. patent application Ser. No. 195,897 comprises an annular drive member secured to the crankshaft of the engine, a magnetizing coil provided in the drive member, a driven member secured to the input shaft of the transmission with leaving a gap to the drive member, and powder provided in the clutch. The powder is made of magnetic material such as chromium steels. When the accelerator pedal is depressed, electric current flows through the magnetizing coil to magnetize the drive member. The powder is aggregated in the gap by the magnetic flux, so that the driven member is coupled to the drive member through the powder. Thus, the output of the engine may be transmitted to the transmission.

The clutch current in the magnetizing coil, that is the clutch torque is progressively increased according to the engine speed, while the clutch slips between the drive member and the drive member. Thus, the vehicle may be smoothly and easily started by depressing the accelerator pedal without operating the clutch pedal.

FIG. 1 shows the variation of the clutch torque during the speed changing. When the shift lever for changing gears is shifted to the neutral position, a shift lever switch is opened, so that the clutch torque goes to zero. When the shift lever is shifted to a speed changing position, the shift lever switch is closed. Thus, the clutch current flows the magnetizing coil, so that the clutch torque increases ⅓ to ⅔ of the rated clutch torque as shown by A. Then, the clutch torque increases with the increase of the engine speed as curve B. At the end of the clutch engaging period $T_2$, the clutch torque steeply increases as C. By the initial rise A of the clutch torque, the driver of the vehicle feels the engagement of the clutch and then accelerates the engine.

However, since the clutch torque increases with the engine speed as shown by B, the clutch torque rapidly increases if the engine speed is greatly increased as the transmission is shifted down. Because of a rapid increase of the clutch torque, an undesirable shock occurs. If the partial engagement period of the clutch is elongated, such a shock may be reduced. However, a long partial engaging condition of the clutch reduces the engine braking effect.

SUMMARY OF THE INVENTION

The object of the present invention is to provide a system which may provide an optimum clutch torque characteristic by increasing stepwise the clutch current.

According to the present invention, there is provided a system for controlling an electro-magnetic clutch having a magnetizing coil comprising gate circuit means for producing a signal by a clutch signal lever operating signal; first circuit means for producing a clutch engaging period signal in response to an output of said gate circuit for a predetermined clutch engaging period; second circuit means for producing a first control signal and a second control signal in dependency on the mode of said clutch engaging period signal; and control circuit means for maintaining the current flowing through said magnetizing coil at a lower value in response to said first control signal for providing a small clutch torque of the clutch and maintaining the current at a rated value in response to said second control signal for completely engaging the clutch.

Other objects and features of the present invention will become apparent from the following description with reference to the accompanying drawing.

BRIEF DESCRIPTION OF THE DRAWING

FIG. 1 is a graph showing a clutch torque characteristic of a conventional electro-magnetic powder clutch, FIG. 2 is a graph showing a clutch torque characteristic of an electro-magnetic powder clutch of the present invention.

DETAILED DESCRIPTION OF THE PREFERRED EMBODIMENTS

Figure 3:
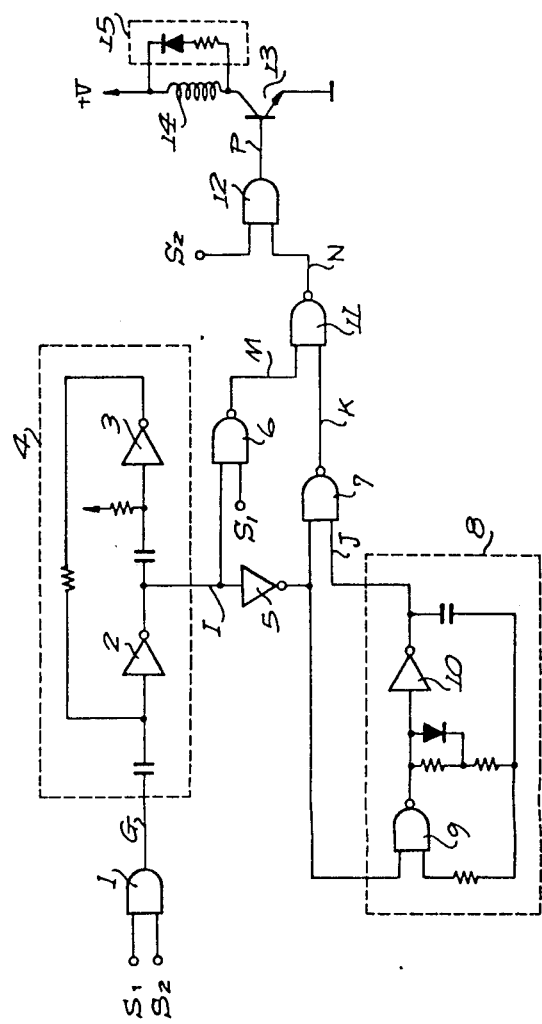
FIG. 3 is a circuit of an embodiment of the present invention.

Referring to FIG. 3, a vehicle speed signal $S_1$ and a shift lever switch signal $S_2$ are fed to an AND gate 1. The level of the signal $S_1$ is high when the vehicle speed exceeds a predetermined speed and the level of the signal $S_2$ is low during the speed changing period $T_1$, which is decided by the operation of a shift lever from one speed to another speed through the neutral position. The output G of the AND gate 1 is fed to a monostable multivibrator 4 comprising inverters 2 and 3. The output I of the monostable multivibrator 4 is connected to an inverter 5 and and NAND gate 6. The NAND gate 6 has one input connected to the speed signal $S_1$. The output of the inverter 5 is also connected to a NAND gate 9 of an oscillator 8 comprising an inverter 10 and to a NAND gate 7. The output J of the inverter 10 is connected to the NAND gate 7. The output K of the NAND gate 7 and the output M of the NAND gate 6 are applied to a NAND gate 11. The output N of the NAND gate 11 is fed to an AND gate 12, the output P of which is in turn fed to a base of a transistor 13. The AND gate 12 has one input also connected to receive the signal $S_2$. A magnetizing coil 14 of an electro-magnetic powder clutch is connected to a collector of the transistor 13. Thus, the transistor 13 forms a control circuit for exciting the magnetizing coil. A commutation circuit 15 comprising a diode is connected in parallel to the coil 14.

Figure 4:
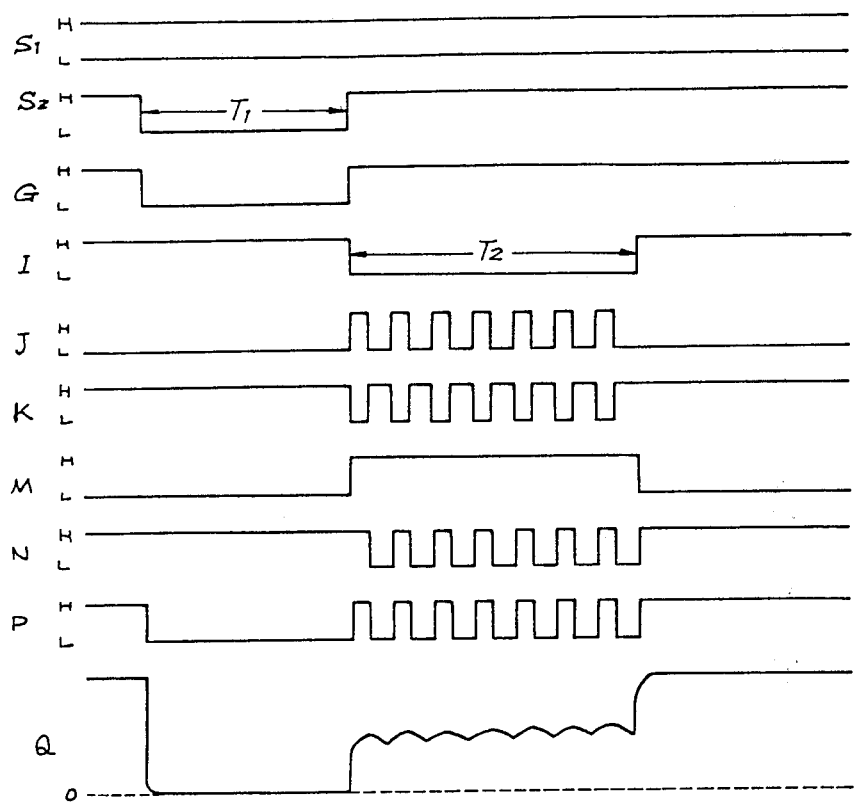
FIG. 4 shows waveforms at various locations in the circuit of FIG. 3.

In operation, when the shift lever of the clutch is operated in a driving condition at a speed over the predetermined speed where the speed signal $S_1$ is high, the signal $S_2$ changes to a low level during the period $T_1$. Thus, the output G of the AND gate 1 goes to a low level as shown in FIG. 4. Since the input signal $S_2$ of the AND gate 12 is low, the output P of the gate is low. Thus, the transistor 13 is turned off and the current does not flow passing the coil 14. Therefore, transmission gears may be changed during the period $T_1$.

When the shift lever is shifted to a change gear engaging position, the output G goes to high level. Thus, the monostable multivibrator 4 produces a low level output signal I during the clutch engaging period $T_2$ by the positive going edge of the signal G. The oscillator 8 operates to produce a pulse train output J by the clutch engaging period signal I and the NAND gate 7 produces an inverted pulse train output K. The output signal I is also applied to the NAND gate 6 for producing a control signal M for the clutch engaging period $T_2$. The output K is inverted into the output N through the NAND gate 11 under the control by the control signal M. The output N is further inverted into the output P through the AND gate 12 under the condition of the high level signal $S_2$. The output P continues as long as the monostable multivibrator 4 produces the signal I during the period $T_2$ for maintaining the high level output M. The transistor 13 is turned on by the signal P, so that the coil 14 is excited by the clutch current. The clutch current is rectified by the commutation circuit 15 and held to a constant rate, which is $\frac{1}{3}$ to $\frac{2}{3}$ of the rated clutch current. The clutch current controlled by the pulse train of the signal P maintains a partial engaging condition of the clutch during the period $T_2$. After the period $T_2$, the signal P is fixed to the high level, so that the transistor 13 is maintained conductive. Thus, the rated clutch current flows through the coil to completely couple the clutch.

FIG. 2 shows the stepwise change of the clutch torque. The clutch torque D rises $\frac{1}{3}$ to $\frac{2}{3}$ of the rated clutch torque. Clutch torque E holds a constant level for the partial engagement condition during the period $T_2$. Thereafter, the clutch torque rises to the maximum as shown by F. It has been proved by an experiment that such a stepwise rise of the clutch torque may provide an optimum coupling operation of the clutch without shocking.

What is claimed is:

1. A system for controlling an electro-magnetic clutch having a magnetizing coil comprising gate circuit means for producing a signal by clutch shift lever operating signal; first circuit means for producing a clutch engaging period signal in response to an output of said gate circuit for a predetermined clutch engaging period; second circuit means for producing a first control signal and a second control signal in dependency on the mode of said clutch engaging period signal; and control circuit means for maintaining the current flowing through said magnetizing coil at a lower value in response to said first control signal for providing a small clutch torque of the clutch and maintaining the current at a rated value in response to said second control signal for completely engaging the clutch.

2. A system for controlling an electro-magnetic clutch according to claim 1 wherein said first circuit means is a monostable multivibrator.

3. A system for controlling an electro-magnetic clutch according to claim 2 wherein said second circuit means includes an oscillator for producing a pulse train and gate circuits, and said control circuit means includes a transistor and a commutation circuit comprising a diode.

* * * * *